Patented Apr. 25, 1939

2,155,685

UNITED STATES PATENT OFFICE 2,155,685

AZO DYES

Swanie S. Rossander, Wilmington, Del., assignor to E. I. du Pont de Nemours & Company, Wilmington, Del., a corporation of Delaware No Drawing. Application February 23, 1938, Serial No. 191,974

7 Claims. (Cl. 260—166)

A. This invention relates to azo dyestuffs and intermediates from which the dyestuffs may be made by simple processes.

B. It is an object of the invention to prepare new azo dyestuffs which have colors similar to dyestuffs known to the prior art but which are possessed of improved properties, particularly washing fastness and substantivity. In order to accomplish the objects I have been obliged to make new intermediate products which are direct dyes and subsequently diazotize and couple these intermediate products on the fiber with developing agents to form the completed dye. Inasmuch as both intermediates and completed dyes are new and useful, I claim them both.

C. Broadly speaking, the objects of the invention are accomplished by coupling products of the type

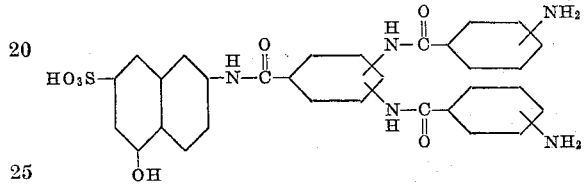

with a diazotized arylamine to form the new intermediate products, which can be used to form the final color by applying to cellulose or regenerated cellulose from an aqueous bath, diazotizing on the fiber, and coupling to a component, such as beta naphthol.

D. An alternative method of producing the intermediate products is to condense an amino-azo compound with a dinitro-aroyl-halide, reduce it, condense the reduction product with nitro-aroyl-halide, and again reduce under conditions such that the azo linkages are not destroyed.

E. The following examples illustrate both methods of preparing the compounds and show the wide diversity of products which fall within the general class:

Example I

Add 27.9 parts of aniline to 1000 parts of water. Add 29.2 parts of hydrochloric acid. Cool to 0° C. by adding 1500 parts of ice. Add 20.7 parts of sodium nitrite as 30% solution as rapidly as absorbed, maintaining 0° C. temperature, Congo acidity and a slight excess nitrite. Diazotize to a 25 minute endpoint.

Slurry 198 parts of di(para-amino-benzoyl)-3:5-diamino-benzoyl-J-acid (di-PAB)-3:5-DAB-J-acid with 9500 parts of water. Add 40 parts of 29% ammonia and stir one-half hour at 20° C. Add 70 parts of 2-normal sodium hydroxide to give complete solution. Add 10 parts of sodium bicarbonate and 400 parts of 2-normal soda ash solution. Cool to 0° C. with ice. Slowly add the diazobenzene solution to the agitated solution. Stir the mixture allowing it to come to room temperature during three or more hours. Maintain a definite alkalinity to Brilliant Yellow paper and an excess of (di-PAB) 3:5-DAB-J-acid. Heat to 70° C. Add sodium chloride (about 10%) until a test portion on filter paper shows a reasonable clean rim. Filter and dry.

The dried product is an orange-red powder, dyeing cotton shades of orange. When these dyeings are diazotized and developed with beta-naphthol, shades of red-orange are obtained.

The above dye has the following structural formula:

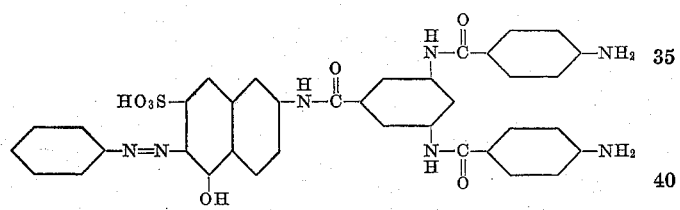

Example II (alternative method)

Add 47 parts of aniline to 200 parts of ice and then add 45.6 parts of hydrochloric acid. Diazotizing at 0° C. with 34.5 parts of sodium nitrite adding more ice as necessary. Maintain a definite acidity to Congo Red paper and a slight excess of nitrite for 15 minutes.

Slurry 120 parts of J-acid with 2000 parts of water and dissolve with 53 parts of soda ash leaving the solution slightly alkaline to brilliant yellow paper. Add 132.5 parts of soda ash and ice the solution to 0° C.

Run the diazobenzene solution slowly into the alkaline J-acid solution with good agitation. Keep strongly alkaline to Brilliant Yellow paper and maintain an excess of J-acid. Stir at least 3 hours. Heat to 65° C. and add 20% salt. Stir 2 hours at 65° C. and filter.

Take up the press-cake in 3000 parts of water and heat to 65° C. with stirring. Keep alkaline to Brilliant Yellow paper with soda ash while adding 140 parts of 3:5-dinitrobenzoyl-chloride dissolved in carbon tetrachloride in small portions. Approximately 75 parts of soda ash are required. Filter off the product.

Slurry the press-cake with 4000 parts of water and add 10 parts of soda ash. Heat to 60–65° C. and add 165 parts of sodium disulfide slowly as required to maintain a moderate excess as shown by the nitro-prusside test. One hour after all the sodium disulfide has been added, add 10% salt and filter.

Take up the press-cake in 2000 parts of water and heat to 65° C. with stirring. Keep alkaline to Brilliant Yellow paper with soda ash while adding 204 parts of p-nitro-benzoyl-chloride dissolved in carbon tetrachloride in small portions. Approximately 120 parts of soda ash are required. Filter off the product, which should be out of solution.

Slurry the press-cake with 2000 parts of water and heat to 65–70° C. Add 10 parts of soda ash. Add 165 parts of sodium disulfide slowly maintaining at all times a medium excess as shown by the nitro-prusside test. One hour after the last addition of sodium disulfide filter off the dye. Dry in an oven at 80–90° C.

The dried product is an orange-red powder, dyeing cotton shades an orange. When these dyeings are diazotized and developed with beta-naphthol, shades of red-orange are obtained.

The dye is represented by the same structural formula as Example I.

Dissolve 66 parts of di-(meta-amino-benzoyl)-3:5-diamino-benzoyl-J-acid in 3000 parts of water and just enough ammonium hydroxide to dissolve. Add 30 parts of sodium bicarbonate and 160 parts of 2-normal soda ash solution. Cool to 10° C. Slowly add the diazo of amino-azo-benzene-sodium sulfonate with good agitation. Stir 3 hours allowing the temperature to rise 20° C. Slowly heat to 70° C. Add sodium chloride and isolate the product in the manner described in Example I.

The dried product is of reddish color. It dyes cotton shades of red. Developed dyeings (with beta-naphthol) are also red in color.

The structural formula of the product follows:

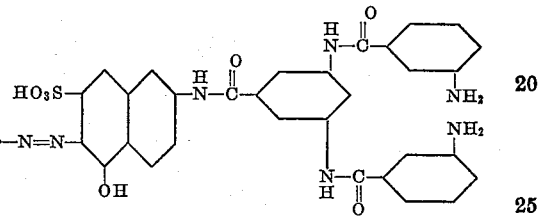

Example IV

Add 98 parts of benzidine-3-3'-disodium sulfonate to 2000 parts of water. Add caustic soda until solution is complete, only very slightly alkaline to Brilliant Yellow paper. Cool to 5° C. Add 150 parts of 10-normal hydrochloric acid solution, followed by the addition of 250 parts of 2-normal sodium nitrite solution as rapidly as absorbed. Keep a slight excess of nitrite for 30 minutes at 0–5° C.

Slurry 312 parts of di-(para-amino-benzoyl)-3:5-diamino-benzoyl J-acid with 10,000 parts of water at 25° C. Cautiously add 60 parts of 29% ammonia solution and stir 20 minutes. Add 70 parts of 2-normal sodium hydroxide to give complete solution. Add 110 parts of sodium bicarbonate and 1000 parts of 2-normal soda ash solution. Cool to 0° C. Slowly add the tetrazo of benzidine 3:3'-disulfonic acid to the solution of di(PAB)-3:5-DAB-J-acid with excellent agitation. Maintain strong alkalinity on Brilliant Yellow paper and an excess of coupling component. Stir twelve hours, allowing to come to room temperature. Slowly heat to 80° C. Add salt (10% by weight) and stir one-half hour. Filter. Dry at 80–90° C. The dried powder is a red-brown powder and gives a red-brown solution in water. It dyes cotton reddish on direct dyeing, which becomes brown after development with beta-naphthol.

The formula for the dye is:

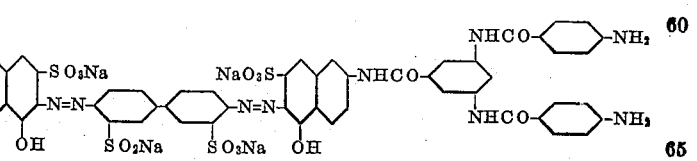

Example III

Slurry 34 parts of 4-amino-azo-benzene-4'-sodium sulfonate with 100 parts of water. Warm to solution. Cool to 60° C. Add 30 parts of 10-normal hydrochloric acid, followed immediately by 160 parts of 2-normal sodium nitrite. Maintain Congo acidity and an excess of nitrite for 20 minutes.

F. The following table is a partial and representative list of the new colors. In this list the first column refers to the diazo component, the second to the coupling component, the third to the color produced directly on cellulose from an aqueous bath containing the intermediate and the fourth the color produced on cellulose by diazotizing the cellulose and impregnating with the intermediate and developing with beta-naphthol. In this table the expression PAB means para-amino-benzoyl, DAB means diamino-benzoyl, and MAB means meta-amino-benzoyl.

J. The developing agents used for coupling to the diazotized products of the dyes of this invention are preferably beta naphthol and 1-phenyl-3-methyl-5-pyrazolone, but acetoacet-

| Ex. | Diazotized component | Coupling component | Shade of dyeing | |
|---|---|---|---|---|
| | | | Direct | Developed |
| 5 | Aniline | Di(PAB)-3:5-DAB-J-acid | Orange | Red-orange. |
| 6 | o-Anisidine | ---do--- | Red | Scarlet. |
| 7 | 2:5-dimethoxy-aniline | ---do--- | ---do--- | Red. |
| 8 | Anthranilic acid | ---do--- | Orange | Orange. |
| 9 | 4-chloro-aniline-3-sulfonic-acid | ---do--- | ---do--- | Do. |
| 10 | Beta-naphthylamine | ---do--- | Red | Scarlet. |
| 11 | 1-naphthylamine-4-sulfonic-acid | ---do--- | ---do--- | Orange. |
| 12 | 2-naphthylamine-6:8-disulfonic acid | ---do--- | ---do--- | Do. |
| 13 | H-acid | ---do--- | Dull orange | Brown. |
| 14 | 4-amino-azobenzene-4'-sulfonic-acid | ---do--- | Red | Red. |
| 15 | 4-amino-3:3'-dimethyl-azobenzene-d'-sulfonic-acid | ---do--- | ---do--- | Do. |
| 16 | 50% o-anisidine, 50% beta-naphthylamine | ---do--- | ---do--- | Scarlet. |
| 17 | Aniline | Di(MAB)-3:5-DAB-J-acid | Orange | Orange. |
| 18 | p-Phenetidine | ---do--- | Red | Scarlet. |
| 19 | p-Amino-benzoic-acid | ---do--- | Orange | Orange. |
| 20 | p-Xylidine | ---do--- | ---do--- | Do. |
| 21 | Beta-naphthylamine | ---do--- | Red | Scarlet. |
| 22 | 4-amino-azobenzene-4'-sulfonic-acid | ---do--- | ---do--- | Red. |
| 23 | Aniline | Di(PAB)-3:5-DAB-Gamma acid | ---do--- | Orange. |
| 24 | 2-naphthylamine-6:8-disulfonic acid→meta-toluidine | Di(MAB)-3:5-DAB-J-acid | Brown | Brown. |
| 25 | H-acid→cresidine | ---do--- | Blue | Green. |
| 26 | 2-naphthylamine-6:8-disulfonic acid→meta-toluidine (condensed with para-nitro-benzoyl-chloride and nitro reduced to amino). | Di(PAB)-3:5-DAB-J-acid | Orange | Orange. |
| 27 | 2-naphthylamine-6:8-disulfonic-acid→meta-toluidine→meta toluidine. | Di(MAB)-3:5-DAB-J-acid | Brown | Brown. |
| 28 | Sulfanilic acid→meta toluidine | Di(PAB)-3:5-DAB-J-acid | Red | Do. |
| 29 | 4-amino-azo-benzene-4'-sodium-sulfonate→di(PAB)-3:5-DAB-J-acid→ | (J-acid)₂ | ---do--- | Violet. |
| 30 | 1-amino-benzene-3-sulfonic acid→2:5-dimethoxyaniline →Di(PAB)-3-DAB-J-acid→ | ---do--- | Brown | Do. |
| | *Tetrazo component* | | | |
| 31 | Benzidine-3:3'-disulfonic acid | [Di(PAB)-3:5-DAB-J-acid]₂ | ---do--- | Reddish brown. |
| 32 | 4:4'-diamino-diphenyl-methane-3:3'-dicarboxylic acid | [Di(MAB)-3:5-DAB-J-acid]₂ | Orange | Orange. |
| 33 | 4:4'-diamino-diphenyl-urea-3:3'-disulfonic acid | ---do--- | Brown | Brown. |
| 34 | 3:3'-diamino-azoxy-benzene-mono-sulfonic acid | ---do--- | ---do--- | Do. |
| 35 | Para-amino-benzoyl-meta-phenylene-diamine | [Di(PAB)-3:5-DAB-J-acid]₂ | ---do--- | Do. |

G. The aroyl group, Aryl-Co, can also be Aryl-SO₂ in the formulae of this invention. For instance, a coupling Aryl-CONH-Aryl can also be Aryl-SO₂NH-Aryl by using the sulfonic acid for condensation in place of the carboxylic acid.

H. The arylamine used as the azo component may be of the benzene, naphthalene, anthracene, diphenyl, diphenyl methane, or stilbene series. It must, of course, have an amino group capable of diazotization. Solubilizing groups, such as sulfonic and carboxylic acid, are preferred as substituents in at least one of the nuclei of the diazo component, but their number should be selected with regard to the number present in the coupling component so that the completed compound, when coupled on the fiber with beta naphthol, will not be soluble.

I. All of the nuclei of the completed compounds of all types may have substituents such as hydroxy, amino, nitro, alkyl, alkoxy, acetyl amino, halogen, carboxylic and sulfonic acid.

anilide, meta-tolylene-diamine are also useful.

K. The following examples illustrate the production of the completed compounds on the fiber.

*Example XXXVI*

Five parts of cotton piece goods is dyed in the usual manner, known to those skilled in the art, with two hundredths parts of aniline—di(para-amino-benzoyl) - 3:5 - diamino-benzoyl - J - acid. The dyed fabric is rinsed in cold water and put in 200 parts of water at 20° C. Add three tenths parts of sodium nitrite and four tenths parts of sulfuric acid. Stir 15 minutes. Rinse with cold water. Dissolve one-tenth part of beta naphthol in 200 parts of water and one twentith part of caustic soda. Stir the solution rapidly while adding the above rinsed piece goods. Stir for 15 minutes. Rinse in cold water and dry. The dyeing is a brought orange shade. The probable formula of the dye on the fiber is:

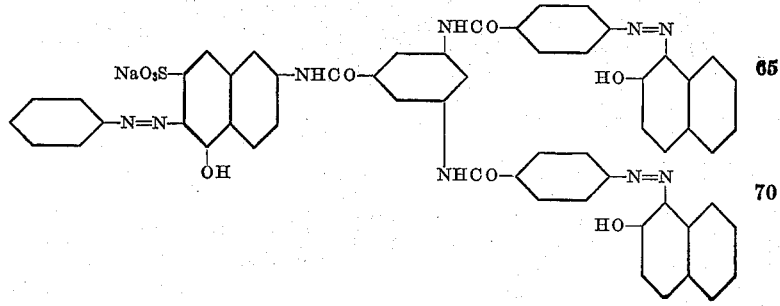

L. The following examples prepared by similar methods further illustrate the colors which can be produced upon the fiber by the process of this invention.

| Ex. | Diazo component | Coupling component | Shade on cellulose |
|---|---|---|---|
| 37 | 2-naphthylamine-6:8-disulfonic acid→meta-toluidine (condensed with para-nitro-benzoyl-chloride and reduced to amine)→Di-(MAB)-3:5-DAB-J-acid. | Beta naphthol | Orange. |
| 38 | Aniline→Di-(PAB)-3:5-DAB-J-acid | 1-phenyl-3-methyl-5-pyrazolone | Yellow orange. |
| 39 | ____do____ | Acetoacet-anilide | Do. |
| 40 | ____do____ | Meta-tolylene-diamine | Brown. |
| 41 | H-acid→cresidine Di-(MAB)-3:5-DAB-J-acid | 1-phenyl-3-methyl-5-pyrazolone | Green. |
| 42 | 4'-amino-azobenzene-4-sulfonic acid→Di-(PAB)-3:5-DAB-J-acid | Beta naphthol | Red. |
| 43 | 4'-amino-3:3'-dimethyl-azobenzene-4-sulfonic acid→Di-(PAB)-3:5-DAB-J-acid. | ____do____ | Do. |
| 44 | 4'-amino-azobenzene-4-sulfonic acid→Di-(MAB)-3:5-DAB-J-acid | ____do____ | Do. |

M. The colors produced by this invention are of outstanding fastness to washing, of exceptional affinity for cellulose (by which term is meant the various celluloses and regenerated cellulose), and of other properties equal to the products in use at the present time.

N. As many apparently widely different embodiments of this invention may be made without departing from the spirit and scope thereof, it is to be understood that I do not limit myself to the specific embodiments thereof except as defined in the appended claims.

I claim:

1. A compound represented by the formula:

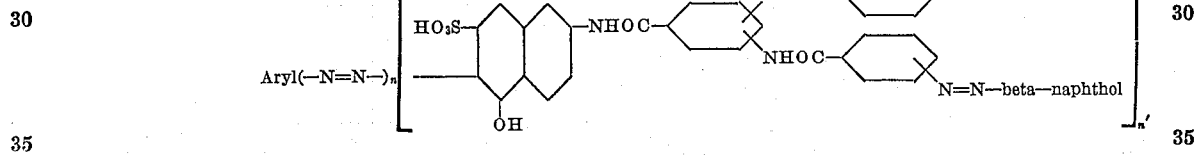

in which $n$ and $n'$ are the same member of a class of digits consisting of 1 and 2, aryl is the nucleus of a compound having a single aromatic nucleus from the class consisting of benzene, naphthalene, diphenyl, and azobenzene, each nucleus has one or more members of the class consisting of hydrogen, halogen, alkyl, alkoxy, amino, nitro, acetyl-amino, carboxyl, and sulfonic acid, and E is an end component from the class consisting of beta-naphthol, phenyl-methyl-pyrazolone, acetoacet-anilide, and meta-tolylene-diamine.

2. A compound represented by the formula:

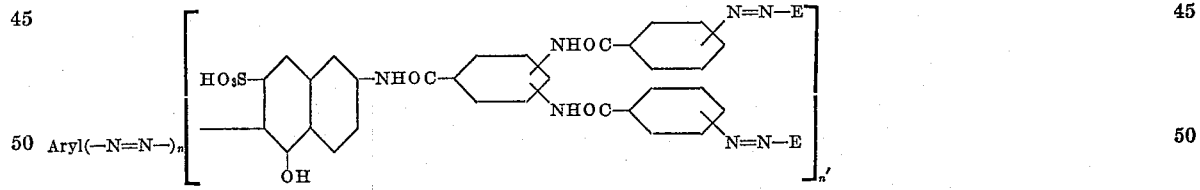

in which $n$ and $n'$ are the same member of a class of digits consisting of 1 and 2, aryl is the nucleus of a compound having a single aromatic nucleus from the class consisting of benzene, naphthalene, diphenyl, and azobenzene, and each nucleus has one or more members of the class consisting of hydrogen, halogen, alkyl, alkoxy, amino, nitro, acetyl-amino, carboxyl, and sulfonic acid.

3. A compound represented by the formula:

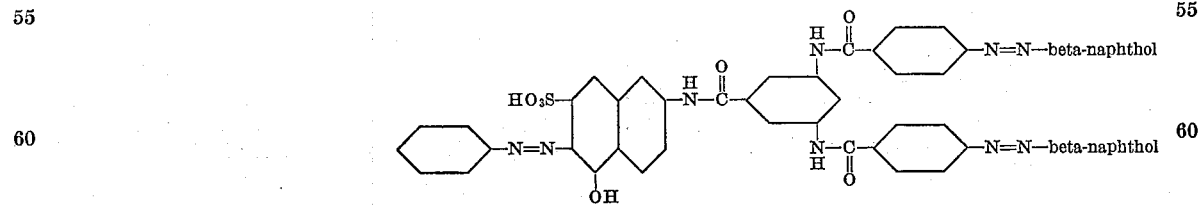

4. A compound represented by the formula:

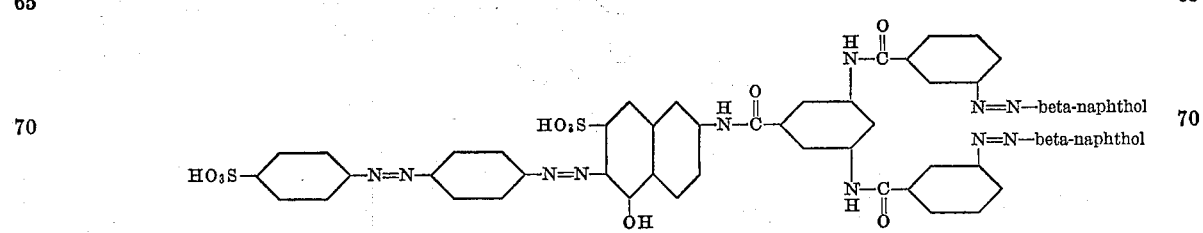

5. A compound represented by the formula:

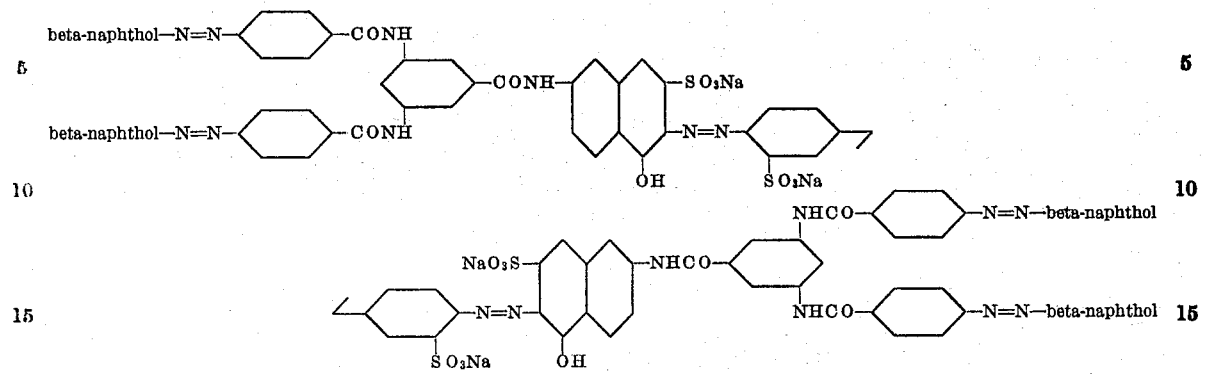

6. The process which comprises diazotizing a compound represented by the formula:

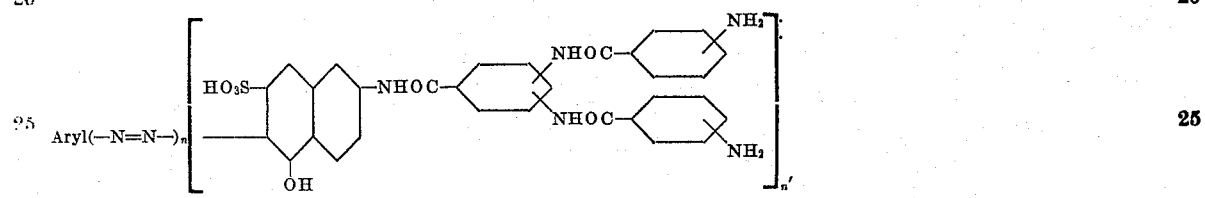

in which $n$ and $n'$ are the same member of a class of digits consisting of 1 and 2, aryl is the nucleus of a compound having a single aromatic nucleus from the class consisting of benzene, naphthalene, diphenyl, and azobenzene, and each nucleus has one or more members of the class consisting of hydrogen, halogen, alkyl, alkoxy, amino, nitro, acetyl-amino, carboxyl, and sulfonic acid, and coupling it to one of a group of compounds consisting of beta-naphthol, phenyl-alkyl-pyrazolone, acetoacet-arylide, and meta-tolylene-diamine.

7. The process which comprises azotizing a compound represented by the formula:

in which aryl is the nucleus of a compound from the class consisting of benzene, naphthalene, diphenyl, and azobenzene, and coupling it on the fiber to a component from the class consisting of beta-naphthol, phenyl-methyl-pyrazolone, acetoacet-anilide, and meta-tolylene-diamine.

SWANIE S. ROSSANDER.